United States Patent
Kalevo et al.

(10) Patent No.: US 7,236,191 B2
(45) Date of Patent: Jun. 26, 2007

(54) METHOD AND SYSTEM FOR IMAGE PROCESSING WITH PIXEL INTERPOLATION USING SECOND ORDER GRADIENTS

(75) Inventors: Ossi Kalevo, Toijala (FI); Henry Rantanen, Tampere (FI)

(73) Assignee: Nokia Corporation, Espoo (FI)

( * ) Notice: Subject to any disclaimer, the term of this patent is extended or adjusted under 35 U.S.C. 154(b) by 797 days.

(21) Appl. No.: 10/426,303

(22) Filed: Apr. 30, 2003

(65) Prior Publication Data
US 2004/0218073 A1 Nov. 4, 2004

(51) Int. Cl.
*H04N 5/228* (2006.01)

(52) U.S. Cl. .................. 348/222.1; 348/272; 348/273; 382/167

(58) Field of Classification Search .............. 348/272, 348/222.1, 234, 273; 382/161, 167, 282, 382/162
See application file for complete search history.

(56) References Cited

U.S. PATENT DOCUMENTS

| | | | |
|---|---|---|---|
| 3,971,065 A | 7/1976 | Bayer | |
| 5,506,619 A | 4/1996 | Adams, Jr. et al. | |
| 5,629,734 A | 5/1997 | Hamilton, Jr. et al. | |
| 5,808,674 A | 9/1998 | Adams, Jr. et al. | |
| 6,075,889 A * | 6/2000 | Hamilton et al. | 382/167 |
| 6,961,478 B2 * | 11/2005 | Inoue | 382/282 |

\* cited by examiner

*Primary Examiner*—Vivek Srivastava
*Assistant Examiner*—Gevell Selby
(74) *Attorney, Agent, or Firm*—Alfred A. Fressola; Ware, Fressola, Van Der Sluys & Adolphson LLP (57) ABSTRACT

The invention relates to a method for processing an image, which comprises at least two color components. The pixel having a color information of the first component locates at least partly in a different location than a pixel having a color information of the second component, wherein an interpolation is performed between the first component and the pixel having the information of the second component. In the interpolation the best interpolation direction is selected and averaging the neighboring pixels having the color information of the first component and calculating a second order gradient from the second component in the selected interpolation direction. The average value is then added to a portion of the second order gradient for the interpolation of the first component. The invention also relates to a system performing said method, to an apparatus, as well as to a computer program.

24 Claims, 4 Drawing Sheets

Fig. 1

| R | G | R7 | G | R |
|---|---|----|---|---|
| G | B | G6 | B | G |
| R1 | G2 | R5 | G8 | R9 |
| G | B | G4 | B | G |
| R | G | R3 | G | R |

Fig. 2a

| B | G | B7 | G | B |
|---|---|----|---|---|
| G | R | G6 | R | G |
| B1 | G2 | B5 | G8 | B9 |
| G | R | G4 | R | G |
| B | G | B3 | G | B |

Fig. 2b

|  |  |  |
|---|---|---|
| G1 | G4 | G7 |
| G2 | G5 | G8 |
| G3 | G6 | G9 |

Fig. 3a

|  |  |  |
|---|---|---|
| R1 |  | R7 |
|  | (R5) | (R8) |
| R3 | (R6) | R9 |

METHOD AND SYSTEM FOR IMAGE PROCESSING WITH PIXEL INTERPOLATION USING SECOND ORDER GRADIENTS

FIELD OF THE INVENTION

This invention relates to the field of digital image processing and more particular to the interpolation of digital images.

BACKGROUND OF THE INVENTION

In digital cameras the image sensor typically receives the incoming light through a Bayer matrix. This matrix has red, blue and green color filters arranged so that every sensor element receives light through only one color filter. This is illustrated in the following, where R represents a sensor element receiving light through a red filter, G represents the sensor element receiving light through a green filter and B represents the sensor element receiving light through a blue filter.

$$
\begin{array}{ccccc}
R & G & R & G & R \\
G & B & G & B & G \\
R & G & R & G & R \\
G & B & G & B & G \\
R & G & R & G & R \\
\end{array}
$$

There are not all three color components for every pixels in the raw camera sensor image. To produce those missing components, interpolation is used for the pixels. Typically this raw image is interpolated afterwards by a separate digital signal processing (DSP) unit or by software in order to get normal red-green-blue-image (RGB), where all the pixels have the three color components. This interpolation is called a color filter array (CFA) interpolation or demosaicing.

By interpolating the image with methods of the prior art, wrong colors can be introduced near the edges. Typical situation is when the luminance of the image changes less or more than an individual color changes. One known interpolation method is introduced in the U.S. Pat No. 5,629,734.

SUMMARY OF THE INVENTION

The object of this invention is to provide an improved color interpolation method, whose performance is better than the methods of the prior art. By using the method according to the invention, the artifact such as ringing is reduced.

This object is achieved in a method for processing an image, which comprises at least first and second components, wherein first pixels having an information of the first component are located at least partly in different locations than second pixels having an information of the second component, wherein the first component is interpolated to the pixels of the second component, wherein the method comprises steps for calculating an average value of neighboring pixels having the information of the first component; determining a second order gradient of neighboring pixels having the information of the second component; determining a portion of said second order gradient to be added to said average value based on at least the value of said second order gradient; and adding to the average value said portion of said second order gradient for the interpolation of said first component.

This object is also achieved in a system for processing an image, which comprises at least first and second components, wherein first pixels having an information of the first component are located at least partly in different locations than second pixels having an information of the second component, wherein the first component is interpolated to the pixels of the second component, wherein the system comprises an averager for calculating an average value of the neighboring pixels having the information of the first component in the selected direction; a derivator for determining the second order gradient from the second component in the selected direction; means for determining a portion of said second order gradient; and an adder for adding the average value to the portion of the second order gradient for the interpolation of the first component.

The object is also achieved in an apparatus for processing an image, which comprises at least first and second components having, wherein first pixels having an information of the first component are located at least partly in different locations than second pixels having an information of the second component, wherein the first component is interpolated to the pixels of the second component, wherein the apparatus comprises an averager for calculating an average value of the neighboring pixels having the information of the first component; a derivator for determining the second order gradient from the second component; means for determining a portion of said second order gradient; and an adder for adding the average value to the portion of the second order gradient for the interpolation of the first component.

The object is also achieved in a computer program for processing an image, which comprises at least first and second components having, wherein first pixels having an information of the first component are located at least partly in different locations than second pixels having an information of the second component, wherein the first component is interpolated to the pixels of the second component, wherein the computer program comprises instructions for calculating an average value of the neighboring pixels having the information of the first component; instructions for determining the second order gradient from the second component; instructions for determining a portion of said second order gradient; and instructions for adding the average value to the portion of the second order gradient for the interpolation of the first component.

One advantage of this invention is the possibility to control the Laplacian correction term, which is obtained from the second order gradient. The use of the Laplacian correction term increases the sharpness of the image. This control mechanism reduces wrong colors near edges. The method according to the invention is simple to implement but remarkably efficient to operate.

BRIEF DESCRIPTION OF THE DRAWINGS

The preferred embodiment of the invention is set forth in the drawings, in the detailed description which follows, and in the claims annexed hereto. Further objects and advantages of the invention are also considered in the description. The invention itself is defined with particularity in the claims.

DETAILED DESCRIPTION OF THE INVENTION

The interpolation method according to the invention utilizes preferably the RGB-model, wherein the components being interpolated have substantially different wavelengths, corresponding colors such as green, red and blue. It is obvious that the interpolating method according to the invention can also utilize another model, which is for example HSI, CMY, CMYK, YUV.

In the method according to the invention the interpolation is done in the one direction, which is selected as the preferred direction. The options for the directions (horizontal-vertical; northwest-southeast-northeast-southwest) varies depending on the situation. The searching is described in more detail in the following description of the preferred embodiment of the invention.

Figure 1:
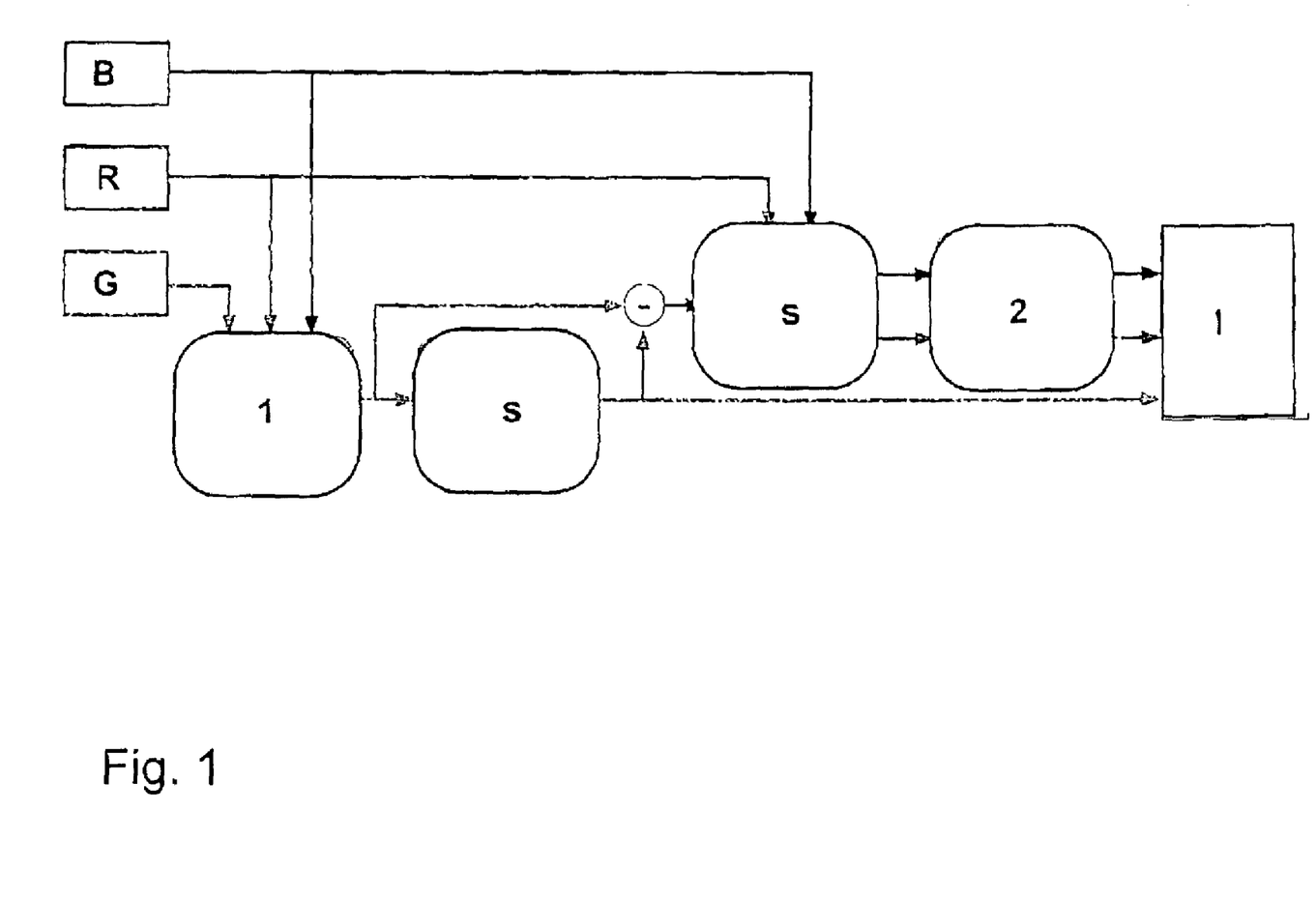
FIG. 1 is an example of the preferred embodiment of the image processing according to the invention.

The preferred embodiment of the interpolation method according to the invention is divided into two parts: 1) the interpolation of the first color, 2) the interpolation of the other colors. The process is shown in FIG. 1, where block 1 corresponds to the interpolation of the first color G and the block 2 corresponds to the interpolation of the other colors R, B. "S" refers to the sharpening of said colors, which sharpening is preferably performed between the interpolation of the first and the other colors. The outcome of the interpolation process is a three-color image I. It should be noticed, that sharpening can also be done before or after the interpolation.

1) The Interpolation of the First Color

Figure 2A:
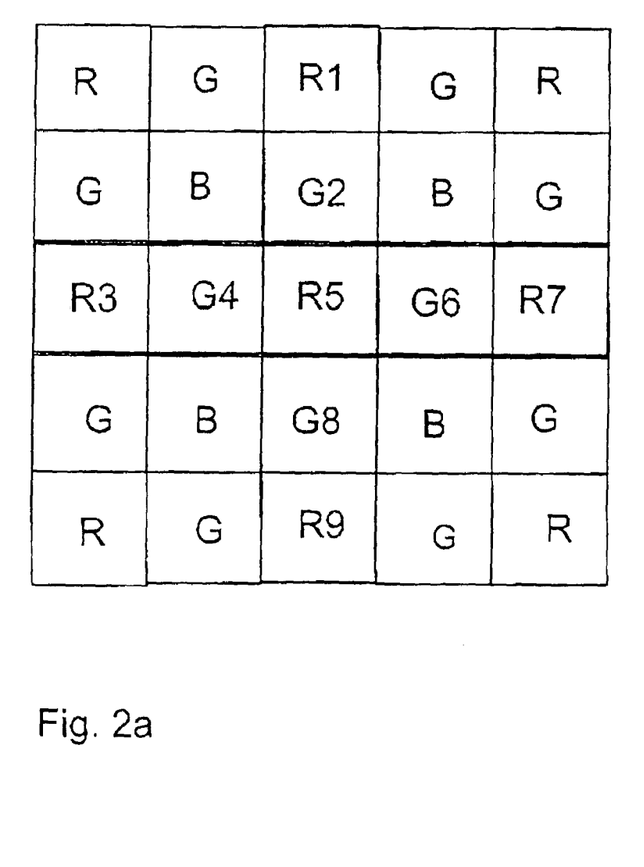
FIG. 2 is an illustration of two embodiments of an interpolation window for the first color component.
Figure 2B:
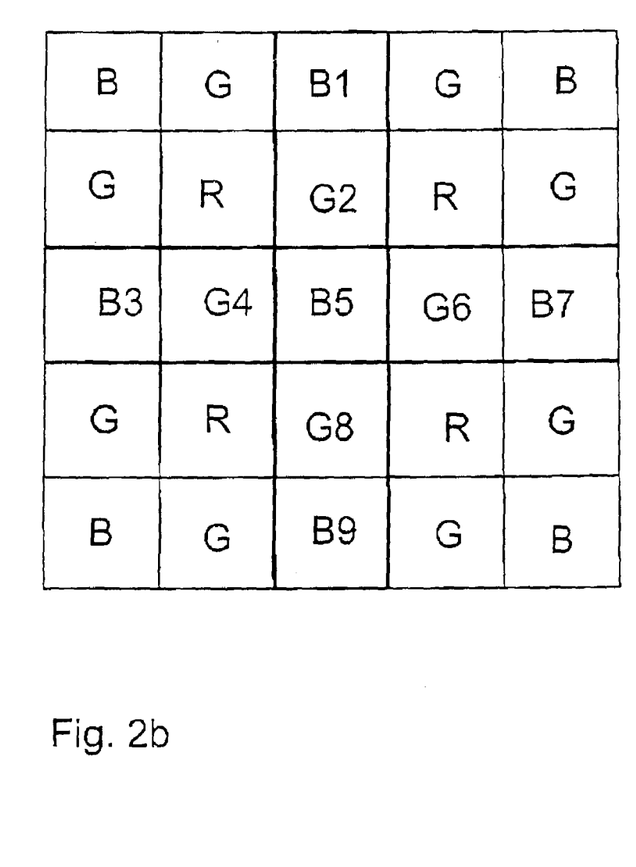

FIG. 2 represents two interpolation windows, where the missing first color G sample is interpolated to the location of the pixels of the other color R5, B5. The window is memory-friendly, which means it consists only of three lines of the first color and three lines of the other color. The first color is preferably a green color component G, the other colors being red R and blue B color components. The reason for this kind of division is due to the ratio of green pixels to blue and red pixels (G:B:R 2:1:1). If the amount of the pixels were different, the first color could be a color component having the largest number of pixels or a component which when changing, has the greatest impact to the luminance of the image.

As can be seen from the FIG. 2, the sample position (5) with missing green component G5 has four neighbor pixels (G2, G4, G6, G8) having green color information. Those neighbor pixels are located vertically and horizontally to the sample position G5. These four green pixel values are not used all together for calculating the output value, but they are divided into two directions, and only one of the directions (the one that is more suitable) is used for the interpolation.

The interpolation is preferably done in the direction of an edge in the image to maintain the sharpness of the edge. If the interpolation is performed across the edge, the edge is softened in the process. To select the best interpolation direction, the changes in the image are analyzed by calculating the vertical and horizontal absolute differences from the green color component. Also two second order gradients (Laplacian), horizontal and vertical, are calculated from another color (red/blue). For the red (2*a*), the formulas are DiffGHor=abs ($G4-G6$)

DiffGVer=abs ($G2-G8$)

LapCHor=($2*R5$)$-R3-R7$

LapCVer=($2*R5$)$-R1-R9$

The formulas for the blue (2*b*) corresponds those for the red:

DiffGHor=abs ($G4-G6$)

DiffGVer=abs ($G2-G8$)

LapCHor=($2*B5$)$-B3-B7$

LapCVer=($2*B5$)$-B1-B9$

The smaller these values are, the smaller a change there is in the image in that direction. On the other hand, a large value indicates a large change in that direction, which is typically caused by an edge in the image. To select the best direction, sums of the differences and the vertical and horizontal Laplacian values are used:

SelHor=DiffGHor+abs (LapCHor)

SelVer=DiffGVer+abs (LapCVer)

If SelHor is less than SelVer, the image is "flatter" in the horizontal direction and the horizontal direction is selected for the interpolation. The interpolation formulas are then as follows:

```
If SelHor < SelVer
    AveG = (G4 + G6) / 2
    LapCorTermG = LapCHor
    TmpOut = AveG + (LapCorTermG / 4)
```

Otherwise, the vertical direction is selected:

```
Else
    AveG = (G2 + G8) / 2
    LapCorTermG = LapCVer
    TmpOut = AveG + (LapCorTermG / 4)
```

The portion of the Laplacian correction term added to the average contains possible edge information not available in the first color component. The novelty of the method according to the invention is how to utilize the Laplacian correction term and the differences between the samples in the interpolation window to further adjust the interpolation.

The absolute value of the selected Laplacian correction term is compared to a predefined threshold ThrG. The value of the predefined threshold ThrG is preferably six (6) in the 8-bit system. If the absolute value of the selected Laplacian correction term is less than the threshold, TmpOut is used as the final output.

```
If (abs (LapCorTermG) < ThrG
    Out = TmpOut
```

Otherwise the effect of the Laplacian term for the final output is changed by calculating an attenuating gain for it. At first the maximum differences in the first and in the other color component are considered. This is done by finding the minimum and maximum of the first color samples G2, G4, G6 and G8 and of the other color component samples R3, R7, R1 and R9 (in red). After this the difference of the both minimum and maximum values is calculated.

```
Else
    MaxG = max (G2, G4, G6, G8)
    MinG = min (G2, G4, G6, G8)
    MaxR = max (R3, R7, R1, R9)
    MinR = max (R3, R7, R1, R9)
    DiffG = MaxG - MinG
    DiffR = c * (MaxR - MinR)
```

The difference of the other color component is attenuated by multiplying it by a constant "c". The value of the constant "c" is 0.5 c 1, preferably c=0.75 (an approximation of 1/sqrt(2)), since the samples are not so close to the location of G5 than the samples of the green color component. If the difference of the first color is less than the difference of the other color, an attenuating gain for the Laplacian correction term and the final output value is calculated as follows:

```
If (DiffG < DiffR)
    Gain = (DiffG + Add) / (DiffR + Add)
    Out = AveG + Gain * LapCorTerm / 4
Else
    Out = TmpOut
```

The Add is used to soften the ratio and the value of it is preferably two. Otherwise the TmpOut is used as the final output. After the interpolation of the first color component, a sharpening can be applied.

Sharpening of the Color Components

The sharpening can be done by any known sharpening method, but the best result comes when using the method described in the applicants earlier application (FI 20021818) filed on 14$^{th}$ Oct. 2002. In said method the first color is sharpened at first, wherein the sharpened first color is used for controlling the sharpening of the second color. In the sharpening of the first color, the change of the first color is calculated in two directions. The direction with the smallest change is compared to the direction with the greatest change, wherein their ratio is further compared to a predetermined limit. The volume of the sharpening of the first color depends on the result of the comparison. The volume of the sharpening of the first color is used for the sharpening of the second color. After the sharpening the second and the third color components are interpolated.

Figure 3A:
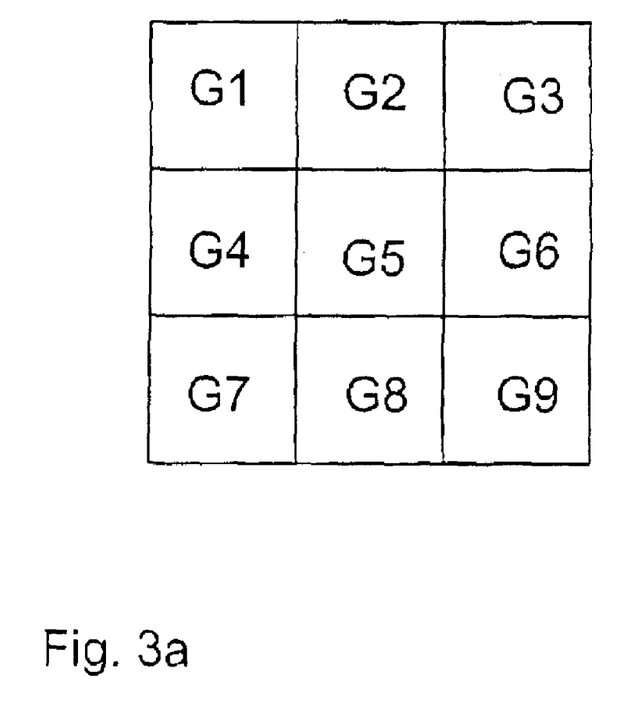
FIG. 3 is an illustration of input samples for the interpolation of red color: a) full resolution green and b) the original red.
Figure 3B:
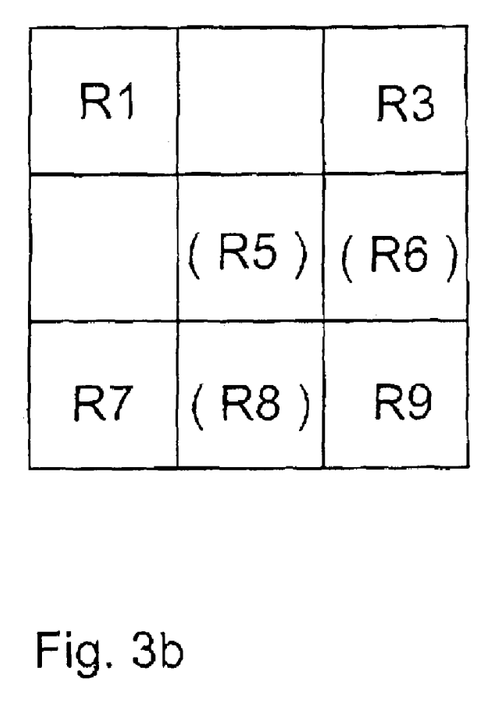

2. Interpolation of the Second and the Third Color:

The interpolation of the second and the third color differs a little from the first color interpolation, since depending on the spatial position, the interpolation window is different. In the earlier example, the first component was green, wherein the second and the third component were red and blue. Reference is now made to the FIGS. 3a and 3b. In the following text, three possible cases for the interpolation of the second color component (FIG. 3b) are shown:

a) Interpolating the red pixel value (R5) for the blue pixel position;

b) Interpolating the red pixel value (R6) for the green pixel position, having the nearest red pixels in vertical direction;

c) Interpolating the red pixel value (R8) for the green pixel position, having the nearest red pixels in horizontal direction.

The processing of the third color (here blue) component is alike. The blue pixel value is interpolated into the red pixel position or the blue pixel value is interpolated into the green pixel position when there are the nearest blue pixels in the horizontal or in the vertical direction. The first color component is already interpolated to full resolution (FIG. 3a), so the interpolated pixels of the first color component can be used to guide the interpolation of the another color component.

a) Interpolating the Red Pixel Value (R5) for the Blue Pixel Position

In this case the preferred directions for the interpolation are the diagonal directions, such as northwest-southeast (NWSE) and northeast-southwest (NESW). Absolute differences from the red and Laplacians from the green component are calculated like in the first color interpolation case:

DiffRNWSE=abs $(R1-R9)$

DiffRNESW=abs $(R3-R7)$

LapGNWSE=$(2*G5)-G1-G9$

LapGNESW=$(2*G5)-G3-G7$

To select the best direction for the interpolation, the sum of the differences and the diagonal Laplacian values are used:

SelNWSE=DiffRNWSE+abs (LapGNWSE)

SelNESW=DiffRNESW+abs (LapGNESW)

If SelNWSE is less than SelNESW, the northwest-southeast direction is selected, and the interpolation is done as follows:

```
If the SelNWSE < SelNESW
    AveR = (R1 + R9) / 2
    LapCorTermR = LapGNWSE
    TmpOutR = AveR + (LapCorTermR / 2)
```

Otherwise the northeast-southwest direction is selected:

```
Else
    AveR = (R3 + R7) / 2
    LapCorTermR = LapGNESW
    TmpOutR = AveR + (LapCorTermR / 2)
```

Like with the interpolation of the first color component, the Laplacian correction term is compared to a predefined threshold ThrC. The value of said predefined threshold is preferably four in an 8-bit system. If the Laplacian correction term is less than the threshold, TmpOutR is used as the final output.

```
If (abs (LabCorTermR) < ThrC
    OutR = TmpOutR
```

Otherwise the difference of the minimum and maximum values of R and G components in the interpolation window is calculated to find an attenuating gain for the Laplacian correction term. The minimum and maximum values are chosen from all the nearest neighboring pixels having original pixel value for the current color.

```
Else
    MaxR = max (R3, R7, R1, R9)
    MinR = min (R3, R7, R1, R9)
    MaxG = max (G3, G7, G1, G9)
    MinG = min (G3, G7, G1, G9)
    DiffR = MaxR - MinR
    DiffG = MaxG - MinG
```

The attenuating gain for the Laplacian correction term is calculated if the max−min difference of the red is less than the max−min difference of the green. Otherwise the previously calculated TmpOutR is used as the final output.

```
If (DiffR < DiffG)
    GainR = (DiffR + Add) / (DiffG + Add)
    Out = AveR + GainR * LapCorTermR / 2
Else
    Out = TmpOutR
``` b) Interpolating the Red Pixel Value (R6) for the Green Pixel Position, Having the Nearest Red Pixels in the Vertical Direction In this case the best interpolation direction is obviously vertical for having the nearest red components in the vertical direction. That is why the calculations for the selection are not needed. Interpolation of the second component corresponds to the aforementioned steps:

$AveR=(R3+R9)/2$ $LapGVer=2*(G6-G3-G9)$ $LapCorTermR=LapGVer$ $TmpOut=(AveR+(LapCorTermR/2))$ The process to determine whether to use the TmpOut as final output is also analogous to the previous case, except now there are only two parameters for the min and max functions because those two are the most suitable (nearest) neighbors to the second component. The attenuating gain value is obtained similarly to the aforementioned steps.

```
If (abs (LapCorTermR) < ThrC
    OutR = TmpOutR
Else
    MaxR = max (R3, R9)
    MinR = min (R3, R9)
    MaxG = max (G3, G9)
    MinG = min (G3, G9)
    DiffR = MaxR - MinR
    DiffG = MaxG - MinG
```

```
If (DiffR < DiffG)
    GainR = (DiffR + Add) / (DiffG + Add)
    Out = AveR + GainR
           * LapCorTermR / 2
Else
    Out = TmpOutR
``` c) Interpolating the Red Pixel Value (R8) for the Green Pixel Position, Having the Nearest Red Pixels in the Horizontal Direction In this case the best interpolation direction is obviously horizontal, for having the nearest red components in the horizontal direction. That is why the calculations for the best selection are not needed in this case either. Interpolation of the second component corresponds to the aforementioned steps:

$AveR=(R7+R9)/2$ $LapGHor=2*G8-G7-G9$ $LapCorTermR=LapGHor$ $TmpOut=(AveR+(LapCorTermR/2))$ The process to determine whether to use the TmpOut as the final output is analogous to the previous case:

```
If (abs (LapCorTermR) < ThrC)
    OutR = TmpOutR
Else
    MaxR = max (R7, R9)
    MinR = min (R7, R9)
    MaxG = max (G7, G9)
    MinG = min (G7, G9)
    DiffR = MaxR - MinR
    DiffG = MaxG - MinG
    If (DiffR < DiffG)
        GainR = (DiffR + Add) / (DiffG + Add)
        Out = AveR + GainR
               * LapCorTermR / 2
    Else
        Out = TmpOutR
```

Figure 4:
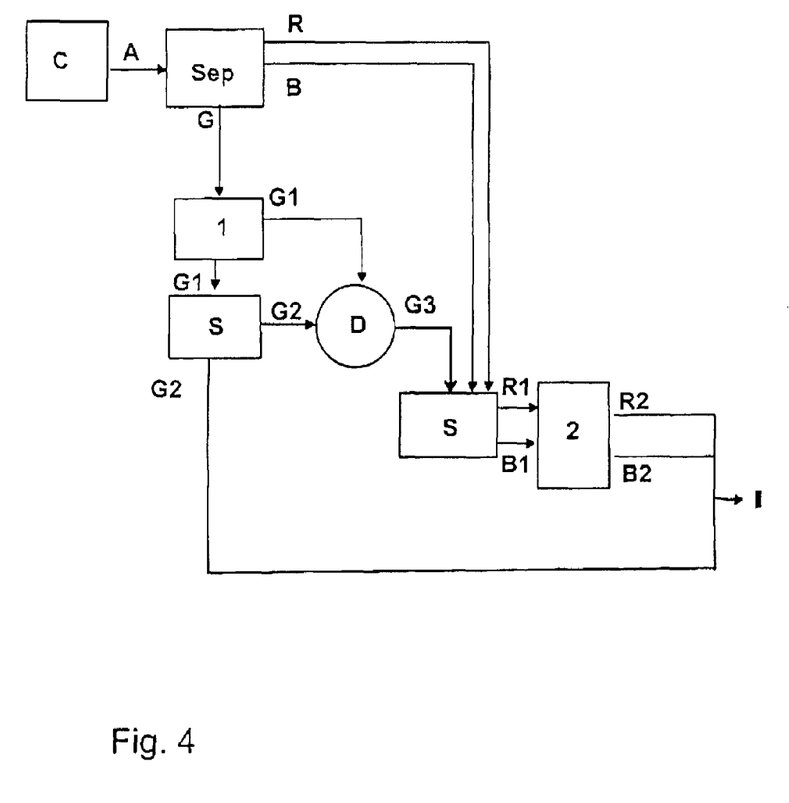
FIG. 4 is an example of the system according to the invention.
Figure 5A:
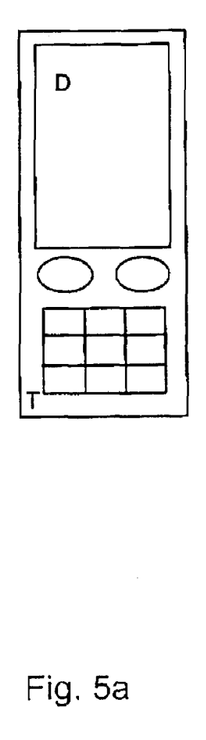
FIG. 5 is principled illustration of the one example of the apparatus using the method according to the invention.
Figure 5B:
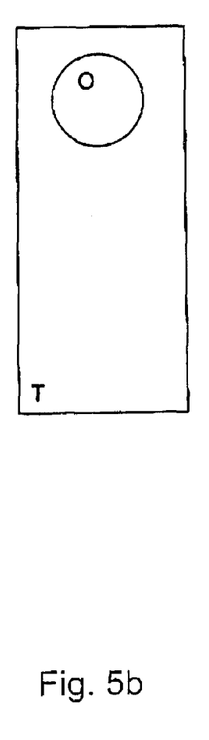

The interpolation method according to the invention can be implemented in the image processing system, such as, for example, the one shown in the FIG. 4. The system comprises an imaging device C, which can be an electronic camera, mobile imaging phone T, such as the one illustrated in FIG. 5 (5a and 5b representing the opposite sides of the device), or other device including only one e.g. CMOS (Complementary Metal-Oxide Semiconductor) or CCD (Charge Coupled Device) sensor. The device captures the image through an object lens O and exposes the image to the CCD- or CMOS- sensor. This sensor transforms the light into digital signals and further into binary digits. The device also comprises a viewfinder, which can be, as in FIG. 5, a display D.

The image taken by this kind of device does not have all color components in every pixel, therefore the pixels are filtered with a color filter and the image is presented to the processing system as e.g. a Bayer array A. The array A is divided into three color components, which can be illustrated by signals R, G, B. Signal G preferably corresponds to the green color component, which is directed to the unit 1 for the interpolation according to the invention. The outcome is an interpolated signal G1, which is preferably then sharpened in the first unit S. The difference of the interpolated signal G1 and the sharpened signal G2 is calculated in the unit D. The difference G3 is directed to the second sharpening unit S together with color signals R, B, being for example the red and the blue color component. These signals R, B are sharpened in the second unit S by the difference value G3. After that sharpened signals R1, B1 are directed to the second interpolation unit 2, wherein the signals R1, B1 are interpolated to form the signals R2, B2. The automatic sharpening to the pixels missing the green color component, takes places in the interpolation unit 2. The outcome of this image processing system is a three color image 1, wherein each color component G, R, B is interpolated and sharpened.

It is obvious to a man skilled in art, that the present invention can be adapted in other systems than those using the Bayer array. The method according to the invention is advantageous in such systems, in which all color components are not collected in all pixels. An example of this kind of system is a device, which registers an intensity value for all the pixels, but registers a color value for some pixels. It is irrelevant for the action and the principle of the invention, how the color components are left out from some pixels. For example, some hexagonal color systems can easily be implemented by using the invention.

It is also obvious, that the color components can be other than green G, red R and blue B. The invention can be adapted, for example, in devices, which registers with different resolution the electromagnetic radiation with any two different wavelengths, for example light, infrared, ultraviolet, gamma- or x-ray-radiation or microwave-radiation. The invention may also be adapted in such cases, where the sharpened components are the composition of the said components. It is obvious that the color component can belong to any of the color group selected from RGC, CMY, CMYK, HSI or YUV.

The image processing system can be implemented as a part of the electronic device, for example as a digital signal processing unit in the camera or similar. There are typically other functions in said electronic device, for example means for displaying the image information to the user and a processor for controlling the image processing system. The digital camera, including the image processing system according to the invention, can preferably be implemented in the mobile device, as an independent module or an integrated module. Said mobile device can additionally have means for telecommunication. Also the digital camera, including the image processing system according to the invention, can be in connection with the data communications network (e.g. Internet), such as WebCam.

It is obvious that the embodiments described above should not be interpreted as limitations of the invention but they can vary in the scope of the inventive features presented in the following claims.

We claimed:

1. A method for processing an image, which comprises at least a first component and a second component, wherein first pixels having information of the first component are located at least partly in different locations than second pixels having information of the second component, and wherein an interpolation of the first component is performed for a pixel having information of other than the first component, wherein the method comprises:
    determining an average value of neighboring pixels having said information of the first component;
    determining a second order gradient of neighboring pixels having said information of the second component;
    determining a portion of said second order gradient to be added to said average value based on at least a value of said second order gradient, wherein if the second order gradient is greater than a predefined threshold value, said portion of the second order gradient is attenuated by a gain value that is based on at least the first component and the second component neighbour value differences;
    adding to the average value said portion of said second order gradient for the interpolation of said first component.

2. The method of claim 1, wherein a first and a second direction is selected for the interpolation.

3. The method of claim 2, wherein the selection of the interpolation direction comprises:
    determining differences between the neighboring pixels having the information of the first component;
    determining a second order gradient from the second component;
    determining a sum of said difference and said second order gradient in both the first and the second direction;
    comparing said sums in the first and the second direction; and
    on the basis of said comparison, selecting for the interpolation the direction having a smaller sum.

4. The method of claim 3, wherein, if the second order gradient is greater than the predefined threshold value, said gain value is obtained by:
    selecting first maximum and minimum values of all the neighboring pixels having information of the first component,
    selecting second maximum and minimum values of all the neighboring pixels having information of the second component,
    determining a difference between the minimum and the maximum values for both the first and the second components, and
    if the difference of the first component is smaller than the difference of the second component, obtaining the gain value from a ratio of at least the difference of the first component to the difference of the second component, and
    wherein the interpolating the first component in the chosen direction is by adding the average value of the neighboring pixels having information of the first component in the chosen direction to the second order gradient from the second component multiplied with the gain value.

5. The method of claim 4, wherein the components belong to the RGB-model.

6. The method of claim 5, wherein the first component corresponds the color green and the second and the third component correspond the colors red and blue.

7. The method of claim 6, wherein the preferred first direction is horizontal and the preferred second direction is vertical, when the first or the second component is green of the RGB-model.

8. The method of claim 7, wherein the preferred first direction is diagonal for the northwest-southeast-direction and the preferred second direction is diagonal for the northeast-southwest, when neither the first component nor the second component is green of the RGB-model.

9. The method of claim 4, wherein the components belong to a model, which is chosen from the set HSI, CMY, CMYK, YUV.

10. A system for processing an image, which comprises at least of a first component and a second component, wherein first pixels having information of the first component are located at least partly in different locations than second pixels having information of the second component, wherein an interpolation of the first component is performed for a pixel having information of other than the first component, wherein the system comprises:
- an averager for determining average values of neighboring pixels having the information of the first component;
- a derivator for determining the second order gradient of the neighboring pixels having the information of the second component;
- an interpolation unit for determining a portion of said second order gradient to be added to said average value based on at least the value of said second order gradient, wherein if the second order gradient is greater than a predefined threshold value, said portion of the second order gradient is attenuated by a gain value that is based on at least the first component and the second component neighbour value differences; and
- an adder for adding the average value to the portion of the second order gradient for the interpolation of the first component.

11. The system of claim 10, wherein the system further comprises a switch for selecting a first and a second direction for the interpolation.

12. The system of claim 11, wherein the system is arranged to select the direction, wherein the interpolation unit is configured:
- for determining differences between the neighboring pixels having the information of the first component and determining the second order gradient from the second component in both the first and the second direction and determining the sums of said differences and second order gradients; and
- for comparing the sums of the first and the second directions and selecting the direction having a smaller sum for the interpolation.

13. The system of claim 12, wherein, if the second order gradient in the chosen direction is greater than the predefined threshold value, obtained by said interpolation unit by:
- selecting first maximum and minimum values of all the neighboring pixels having the information of the first component;
- selecting second maximum and minimum values of all the neighboring pixels having the information of the second component;
- determining differences between the minimum and the maximum values of both the first and second components, which difference of the second component may also be attenuated by a predetermined constant value; and
- comparing the difference of the first component to the difference of the other component, and when it is smaller, the gain value is a difference ratio of the first component to the second component, and
- whereupon the system is arranged to interpolate the first component in the chosen direction by adding the average value of the neighboring pixels having information of the first component in the chosen direction to the second order gradient from the second component multiplied with the gain value.

14. The system of claim 13, wherein the system is arranged to utilize a model, which is chosen from the set RGB, HSI, CMY, CMYK and YUV.

15. An apparatus for processing an image, which comprises at least a first component and a second component, wherein first pixels having an information of the first component are located at least partly in a different location than second pixels having an information of the second component, wherein an interpolation of the first component is performed for a pixel having information of other than the first component, wherein the apparatus comprises:
- an averager for determining an average value of neighboring pixels having the information of first component,
- a derivator for determining a second order gradient from the second component,
- an interpolation unit determining a portion of said second order gradient to be added to said average value based on at least the value of said second order gradient, wherein if the second order gradient is greater than a predefined threshold value, said portion of the second order gradient is attenuated by a gain value that is based on at least the first component and the second component neighbour value differences, and
- an adder for adding the average value to a portion of the second order gradient for the interpolation of the first component.

16. The apparatus of claim 15, wherein the apparatus further comprises a switch for selecting a first and a second direction for the interpolation.

17. The apparatus of claim 16, wherein the apparatus is arranged to select the direction, wherein the interpolation unit is configured:
- for determining differences between the neighboring pixels having the information of the first component and determining the second order gradient from the second component in the both first and the second direction and determining sums of said differences and second order gradients together, and
- for comparing the sums of the first and the second directions and, on the basis of said comparison, selecting the direction having a smaller sum for the interpolation.

18. The apparatus of claim 17, wherein, if the second order gradient in the chosen direction is greater than the predefined threshold value, said gain value is obtained by said interpolation unit by:
- selecting first maximum and minimum values of all the neighboring pixels having the information of the first component,
- selecting second maximum and minimum values of all the neighboring pixels having the information of the second component,
- determining differences between the minimum and the maximum values of both the first and second components, which difference of the second component may also be attenuated by a predetermined constant value, and
- comparing the difference of the first component to the difference of the other component, and when it is smaller, the gain value is the difference ratio of the first component to the second component, and
- whereupon the apparatus is arranged to interpolate the first component in the chosen direction by adding the average value of the neighboring pixels having information of the first component in the chosen direction to the second order gradient from the second component multiplied with the gain value.

19. The apparatus of claim 18, wherein the apparatus utilizes the model, which is chosen from the set RGB, HSI, CMY, CMYK and YUV.

20. The apparatus of claim 15, wherein the apparatus further comprises the means for telecommunication.

21. A computer readable medium having encoded thereon a computer program for processing an image, which comprises at least of a first and a second component, wherein first pixels having information of the first component are located at least partly in a different location than second pixels having information of the second component, comprising a set of instructions when executed by a computer to implement a method for interpolating, wherein an interpolation of the first component is performed for a pixel having information of other than the first component, the method comprising:

determining an average value of the neighboring pixels having the information of the first component, determining the second order gradient from the second component, determining a portion of said second order gradient to be added to said average value based on at least the value of said second order gradient, wherein if the second order gradient is greater than a predefined threshold value, said portion of the second order gradient is attenuated by a gain value that is based on at least the first component and the second component neighbour value differences, and adding the average value to the portion of the second order gradient for the interpolation of the first component.

22. The computer readable medium of claim 21, wherein the computer program comprises also instructions for selecting a first and a second direction for the interpolation.

23. The computer readable medium of claim 22, wherein the computer program also comprises instructions for selecting the direction by determining differences between the neighboring pixels having the information of the first component and determining the second order gradient from the second component in the both first and the second direction and determining sums of said differences and second order gradients together, and comparing the sums of the first and the second directions and, on the basis of said comparison, selecting the direction having a smaller sum for the interpolation.

24. The computer readable medium of claim 23, wherein if the computer program determines that the second order gradient in the chosen direction is greater than the predefined gain value, then said gain value is obtained by the computer program instructions for selecting the first maximum and minimum values of all the neighboring pixels having the information of the first component, selecting the second maximum and minimum values of all the neighboring pixels having the information of the second component, determining differences between the minimum and the maximum values of both the first and second components, which difference of the second component may also be attenuated by a predetermined constant value, and comparing the difference of the first component to the difference of the other component, and when it is smaller, the gain value is the difference ratio of the first component to the second component, and whereupon the computer program has instructions for interpolating the first component in the chosen direction by adding the average value of the neighboring pixels having information of the first component in the chosen direction to the second order gradient from the second component multiplied with the gain value.

* * * * *

UNITED STATES PATENT AND TRADEMARK OFFICE
CERTIFICATE OF CORRECTION

PATENT NO.       : 7,236,191 B2  
APPLICATION NO.  : 10/426303  
DATED            : June 26, 2007  
INVENTOR(S)      : Kalevo et al.

Page 1 of 1

It is certified that error appears in the above-identified patent and that said Letters Patent is hereby corrected as shown below:

At column 11, line 42, claim 13, line 3, please insert --said gain value is-- after the word "value,".

Signed and Sealed this

Twentieth Day of November, 2007

JON W. DUDAS  
*Director of the United States Patent and Trademark Office*